US012750359B2

(12) United States Patent
Thompson et al.

(10) Patent No.: US 12,750,359 B2
(45) Date of Patent: Sep. 29, 2026

(54) SECURE CONTEXTUAL INFORMATION RETRIEVAL FOR AUTHENTICATION MESSAGING

(71) Applicant: OKTA, INC., San Francisco, CA (US)

(72) Inventors: Daniel Thompson, Warwickshire (GB); Milan Khan, London (GB); Tomas Carter, Manchester (GB); Andrew Blake Barlow, Grantown-on-Spey (GB)

( * ) Notice: Subject to any disclaimer, the term of this patent is extended or adjusted under 35 U.S.C. 154(b) by 112 days.

(21) Appl. No.: 18/957,434

(22) Filed: Nov. 22, 2024

(65) Prior Publication Data

US 2026/0149709 A1 May 28, 2026

(51) Int. Cl.
*H04L 9/40* (2022.01)

(52) U.S. Cl.
CPC ........ *H04L 63/083* (2013.01); *H04L 63/0876* (2013.01); *H04L 63/108* (2013.01)

(58) Field of Classification Search
CPC .. H04L 63/083; H04L 63/0876; H04L 63/108
See application file for complete search history.

(56) References Cited

U.S. PATENT DOCUMENTS

2014/0096215 A1* 4/2014 Hessler ................. H04W 12/06 726/7
2014/0227999 A1* 8/2014 Ferlin ................... H04L 9/3215 455/411
2015/0112870 A1* 4/2015 Nagasundaram .. G06Q 20/3821 705/67
2016/0371703 A1* 12/2016 Monegan .............. H04L 67/148
2017/0091780 A1* 3/2017 Kannan ............... G06F 16/3331
2018/0041479 A1* 2/2018 Wang .................. H04L 63/0838
2018/0316668 A1* 11/2018 Yasarapu ............. G06Q 50/265
2021/0227009 A1* 7/2021 Carney Landow ... H04L 65/612

FOREIGN PATENT DOCUMENTS

WO WO-2005094264 A2 * 10/2005 ........... H04L 63/083

OTHER PUBLICATIONS

Govaerts et al., "Blending Digital and Face-to-Face Interaction Using a Co-Located Social Media App in Class," in IEEE Transactions on Learning Technologies, vol. 11, No. 4, pp. 478-492, Oct. 1-Dec. 2018.*

* cited by examiner

*Primary Examiner* — Morshed Mehedi
(74) *Attorney, Agent, or Firm* — Holland & Hart LLP

(57) ABSTRACT

An identity management system may utilize an authentication server for secure contextual information retrieval for authentication messaging. The authentication server may receive, from an application, a request to initiate an authentication procedure associated with an interaction by a user with the application. The authentication server may then transmit, to the user, a request to authenticate the interaction that includes an identifier for contextual information associated with the interaction. The authentication server may further receive, from the user, a request for the contextual information that includes the identifier for the contextual information. In response, the authentication server may transmit, to the user, the contextual information based on the previous request including the identifier for the contextual information. The authentication server then may receive, from the user, an indication of whether the interaction at the application is authenticated. In response, the authentication server may then transmit the indication to the application.

20 Claims, 7 Drawing Sheets

SECURE CONTEXTUAL INFORMATION RETRIEVAL FOR AUTHENTICATION MESSAGING

FIELD OF TECHNOLOGY

The present disclosure relates generally to identity management, and more specifically to secure contextual information retrieval for authentication messaging.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

In some examples of an identity management system, users may receive authentication requests to approve or deny interactions within applications or services. In some cases, when receiving an authentication request, the user may receive little to no information associated with the interaction that the user is being requested to authenticate. Further, based on how the authentication request is transmitted from an authentication server to a respective user, including additional information associated with the interaction within the authentication request may be relatively insecure and can result in potential security risks

SUMMARY

A method for backchannel authentication by an apparatus is described. The method may include receiving, from a first application, a first request to initiate a backchannel authentication procedure associated with an interaction by a first user with the first application, the first request including an indication of the interaction, transmitting, to the first user, a second request to authenticate the interaction at the first application indicated via the first request, the second request including an identifier for a set of contextual information associated with the interaction, receiving, from the first user, a third request for the set of contextual information associated with the interaction, the third request including the identifier for the set of contextual information, transmitting, to the first user, the set of contextual information associated with the interaction based on the third request including the identifier for the set of contextual information, receiving, from the first user and in response to the second request, an indication of whether the interaction at the first application is authenticated based on transmitting the set of contextual information, and transmitting, to the first application, the indication based on receiving the indication from the first user.

An apparatus for backchannel authentication is described. The apparatus may include one or more memories storing processor executable code, and one or more processors coupled with the one or more memories. The one or more processors may individually or collectively be operable to execute the code to cause the apparatus to receive, from a first application, a first request to initiate a backchannel authentication procedure associated with an interaction by a first user with the first application, the first request including an indication of the interaction, transmit, to the first user, a second request to authenticate the interaction at the first application indicated via the first request, the second request including an identifier for a set of contextual information associated with the interaction, receive, from the first user, a third request for the set of contextual information associated with the interaction, the third request including the identifier for the set of contextual information, transmit, to the first user, the set of contextual information associated with the interaction based on the third request including the identifier for the set of contextual information, receive, from the first user and in response to the second request, an indication of whether the interaction at the first application is authenticated based on transmitting the set of contextual information, and transmit, to the first application, the indication based on receiving the indication from the first user.

Another apparatus for backchannel authentication is described. The apparatus may include means for receiving, from a first application, a first request to initiate a backchannel authentication procedure associated with an interaction by a first user with the first application, the first request including an indication of the interaction, means for transmitting, to the first user, a second request to authenticate the interaction at the first application indicated via the first request, the second request including an identifier for a set of contextual information associated with the interaction, means for receiving, from the first user, a third request for the set of contextual information associated with the interaction, the third request including the identifier for the set of contextual information, means for transmitting, to the first user, the set of contextual information associated with the interaction based on the third request including the identifier for the set of contextual information, means for receiving, from the first user and in response to the second request, an indication of whether the interaction at the first application is authenticated based on transmitting the set of contextual information, and means for transmitting, to the first application, the indication based on receiving the indication from the first user.

A non-transitory computer-readable medium storing code for backchannel authentication is described. The code may include instructions executable by one or more processors to receive, from a first application, a first request to initiate a backchannel authentication procedure associated with an interaction by a first user with the first application, the first request including an indication of the interaction, transmit, to the first user, a second request to authenticate the interaction at the first application indicated via the first request, the second request including an identifier for a set of contextual information associated with the interaction, receive, from the first user, a third request for the set of contextual information associated with the interaction, the third request including the identifier for the set of contextual information, transmit, to the first user, the set of contextual information associated with the interaction based on the third request including the identifier for the set of contextual information, receive, from the first user and in response to the second request, an indication of whether the interaction at the first application is authenticated based on transmitting the set of contextual information, and transmit, to the first application, the indication based on receiving the indication from the first user.

In some examples of the method, apparatus, and non-transitory computer-readable medium described herein, transmitting the indication may include operations, features, means, or instructions for transmitting, to the first application, one or more authentication tokens based on the interaction at the first application being authenticated.

In some examples of the method, apparatus, and non-transitory computer-readable medium described herein, transmitting the indication may include operations, features, means, or instructions for transmitting, to the first application, a first indication that the first user authenticated the interaction at the first application or a second indication that the first user denied authenticating the interaction at the first application.

In some examples of the method, apparatus, and non-transitory computer-readable medium described herein, transmitting the second request may include operations, features, means, or instructions for transmitting the second request via a push notification message, the push notification message including the identifier for the set of contextual information associated with the interaction and an access token that may be associated with a device key, the device key being associated with a device operated by the first user.

In some examples of the method, apparatus, and non-transitory computer-readable medium described herein, transmitting the second request via the push notification message may include operations, features, means, or instructions for transmitting, via the push notification message, a request to access the first application, the request to access the first application including a request for a set of login credentials associated with the first application and the first user, receiving, from the first application via the third request, the identifier for the set of contextual information, the set of login credentials, the access token indicated via the second request, and a proof-of-possession indication, and transmitting, to the first user, the set of contextual information associated with the interaction based on the set of login credentials indicated via the third request being associated with the first application and the first user and on authentication of the access token and the proof-of-possession indication.

In some examples of the method, apparatus, and non-transitory computer-readable medium described herein, the identifier for the set of contextual information may be a randomly generated identifier.

Some examples of the method, apparatus, and non-transitory computer-readable medium described herein may further include operations, features, means, or instructions for transmitting, to the first application and in response to the first request, an authentication request identifier, receiving, from the first application, a fourth request for one or more authentication tokens, the fourth request including the authentication request identifier, and refraining from providing a response to the fourth request prior to receiving the indication of whether the interaction at the first application may be authenticated.

Some examples of the method, apparatus, and non-transitory computer-readable medium described herein may further include operations, features, means, or instructions for transmitting, to the first application and subsequent to receiving the indication of whether the interaction at the first application may be authenticated, the one or more authentication tokens in response to the fourth request based on the first user authenticating the interaction at the first application.

Some examples of the method, apparatus, and non-transitory computer-readable medium described herein may further include operations, features, means, or instructions for transmitting, to the first application, an authentication expiration indication based on an expiration of a timer associated with receiving the indication from the first user of whether the interaction at the first application may be authenticated, where the authentication expiration indication includes a denial of authentication of the interaction at the first application.

DETAILED DESCRIPTION

Figure 1:
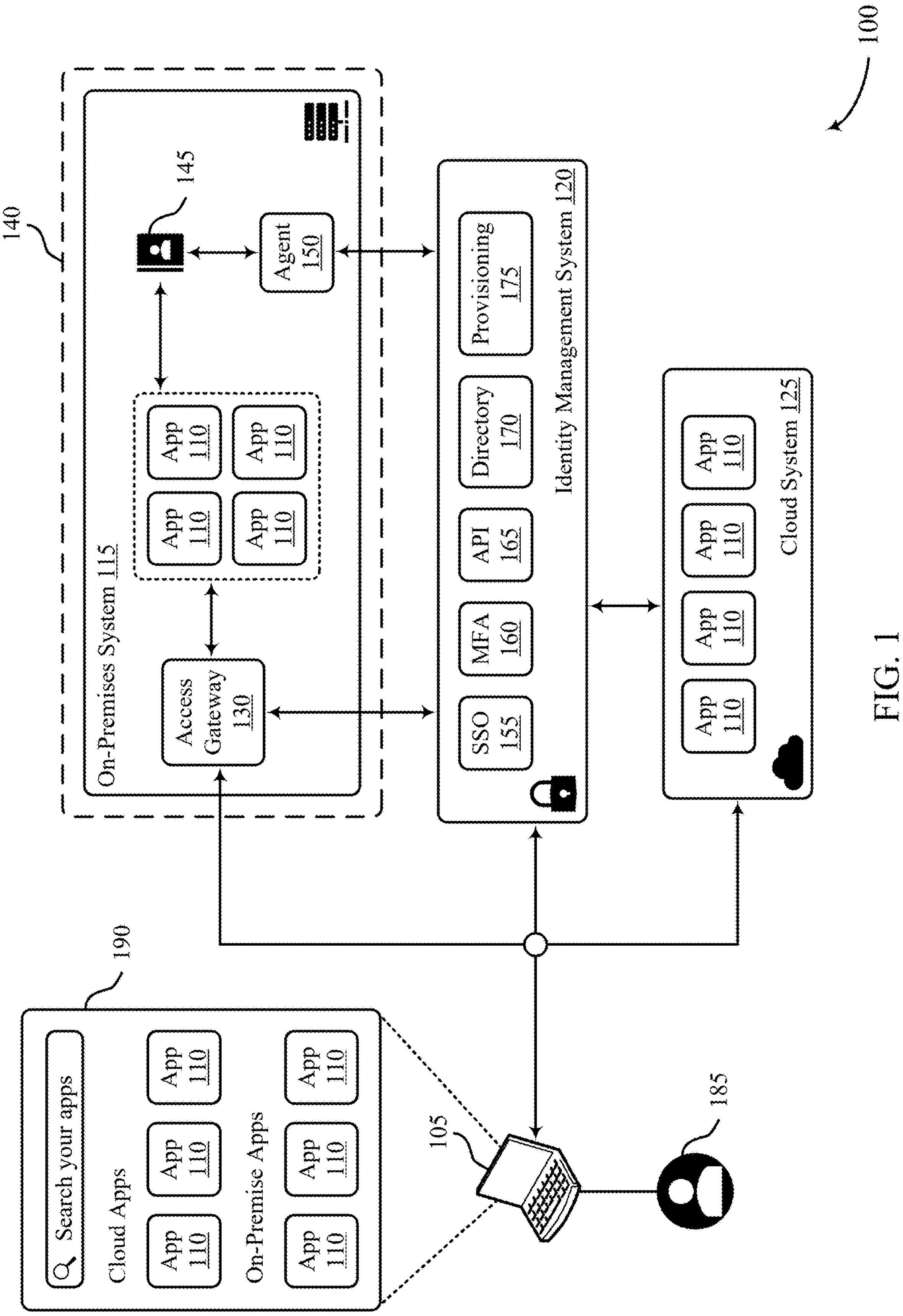
FIGS. 1 and 2 illustrate an example of a computing system that supports secure contextual information retrieval for authentication messaging in accordance with aspects of the present disclosure.

In some examples, a user may receive notifications or messages requesting to approve or deny authentication requests. For example, a user may receive a message requesting to authorize an interaction within an application or for a service. In some cases, the user may receive the request via (e.g., within) a push notification. For example, an authentication server may transmit a push notification to a computing device of a user to request the user to authorize a user interaction. However, push notifications may be unable to include large quantities of data to indicate information associated with the user interaction that the user is being requested to authorize. For example, the push notification may include a relatively simple message asking the user to approve or deny an interaction within a respective service or application. Further, because push notifications may be relatively insecure, including additional information related to the user interaction may lead to potential security risks.

Thus, to limit the security risks of authentication requests via push notifications, the techniques of the present disclosure may enable a user to retrieve contextual information about an authentication request prior to approving or denying the request. For example, as an initial step, after a first application detects a user interaction, an authentication server may receive, from the first application, a first request to initiate a backchannel authentication procedure associated with an interaction by a first user with the first application. Further, the first request may include an indication of the interaction. In response, the authentication server may transmit, to the first user, a second request to authenticate the interaction at the first application indicated via the first request. In some instances, the second request may include an identifier for a set of contextual information associated with the interaction. Based on receiving the second request, the first user may then transmit, to the authentication server, a third request for the set of contextual information associated with the interaction. Further, the first user may include the identifier for the set of contextual information within the third request.

In response, the authentication server may transmit, to the first user, the set of contextual information associated with the interaction based on the third request including the identifier for the set of contextual information. Utilizing the set of contextual information, the first user may transmit, to the authentication server in response to the second request, an indication of whether the interaction at the first application is authenticated. In response to receiving the indication from the first user, the authentication server may then transmit the indication to the first application. Thus, the first user may provide the authentication server with an authentication indication based on viewing the contextual information of the authentication request therefore providing relatively more secure techniques for users receiving and responding to authentication requests.

In some examples, the second request for the first user to authenticate the interaction at the first application may be a push notification that triggers a user to access the first application. Thus, the first user may provide the first application with one or more login credentials to access the first application. If the login credentials are successfully authenticated, the first user may then be provided with the set of contextual information within the first application. For example, if the second request is for the first user to authenticate an purchase and the first application is an application associated with a financial institution, the second request may trigger the first user to login to an application for the financial institution to view the set of contextual information associated with the purchase to then approve or deny the purchase. Moreover, when the first user logs into the first application successfully, the third request for the set of contextual information may be transmitted based on the successful login attempt, which may result in the set of contextual information then being transmitted to the user within a user interface of the first application. Thus, the first user may be able to view the set of contextual information of the purchase within a user interface of the application associated with the financial institution and approve or deny the authentication request. Therefore, the techniques of the present disclosure may ensure that the set of contextual information is received by an authenticated user within a secure environment Further, the techniques of the present disclosure may increase the reliability and security of authentication requests. For example, by preventing including contextual information associated with an interaction within a push message that is requesting authentication of the interaction, the techniques of the present disclosure may ensure that an authorized user views the set of contextual information. Thus, the techniques of the present disclosure may ensure that authentication requests are answered by the user that the authentication requests are intended for and not fraudulent users. Therefore, the techniques of the present disclosure may improve the security of an authentication system thus resulting in a relatively more secure and reliable authentication system.

Aspects of the disclosure are initially described in the context of a computing system. Additional aspects of the disclosure are described with reference to a computing system and a process flow. Aspects of the disclosure are further illustrated by and described with reference to apparatus diagrams, system diagrams, and flowcharts that relate to secure contextual information retrieval for authentication messaging.

FIG. 1 illustrates an example of a computing system 100 that supports secure contextual information retrieval for authentication messaging in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100. Further, in some examples, the computing device 105 may be representative of one or more computing devices 105 that operate individually or collectively.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120). Additionally, or alternatively, the access gateway 130, the directory service 145, the software agent 150, or any combination thereof that are illustrated as being associated with the on-premises system 115 may be hosted on or via the on-premises system 115, the cloud system 125, or both.

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

In some examples of the computing system 100, users 185 operating a computing device 105 may receive notifications or messages requesting the user to approve or deny authentication requests. For example, a user 185 may receive a message requesting to authorize an interaction within an application 110. In some cases, the user 185 may receive the request within a push notification. For example, an authentication server may transmit a push notification to a computing device 105 of a user 185 to request the user 185 to authorize a user 185 interaction. However, push notifications may be unable to include large quantities of data to indicate information associated with the user 185 interaction that the user 185 is being requested to authorize. For example, the push notification may include a simple message asking the user 185 to approve or deny an interaction within a respective application 110. Further, as push notifications may be relatively insecure, including additional information related to the user 185 interaction may lead to potential security risks.

Thus, to limit the security risks of authentication requests via push notifications, the techniques of the present disclosure may enable a user 185 to retrieve contextual information about an authentication request prior to approving or denying the request. For example, as an initial step, after an application 110 detects a user interaction, an authentication server (e.g., a server associated with the identity management system 120) may receive, from the application 110, a first request to initiate a backchannel authentication procedure associated with an interaction by a user 185 with the application 110. Further, the first request may include an indication of the interaction. In response, the authentication server may transmit, to the user 185, a second request to authenticate the interaction at the application 110 indicated via the first request, the second request including an identifier for a set of contextual information associated with the interaction. Based on receiving the second request, the user 185 may then transmit, to the authentication server, a third request for the set of contextual information associated with the interaction. Further, the user 185 may include the identifier for the set of contextual information within the third request. Moreover, in response, the authentication server may transmit, to the user 185, the set of contextual information associated with the interaction based on the third request including the identifier for the set of contextual information. Utilizing the set of contextual information, the user 185 may transmit, to the authentication server in response to the second request, an indication of whether the interaction at the application 110 is authenticated. In response to receiving the indication from the user 185, the authentication server may then transmit the indication to the application 110 such that the application 110 can approve or deny the interaction. Thus, the user 185 may provide the authentication server with an authentication indication based on viewing the contextual information of the authentication request therefore providing relatively more secure techniques for users receiving and responding to authentication requests. Further descriptions of the techniques of the present disclosure may be described elsewhere herein, such as with reference to FIGS. 2 and 3.

Figure 2:
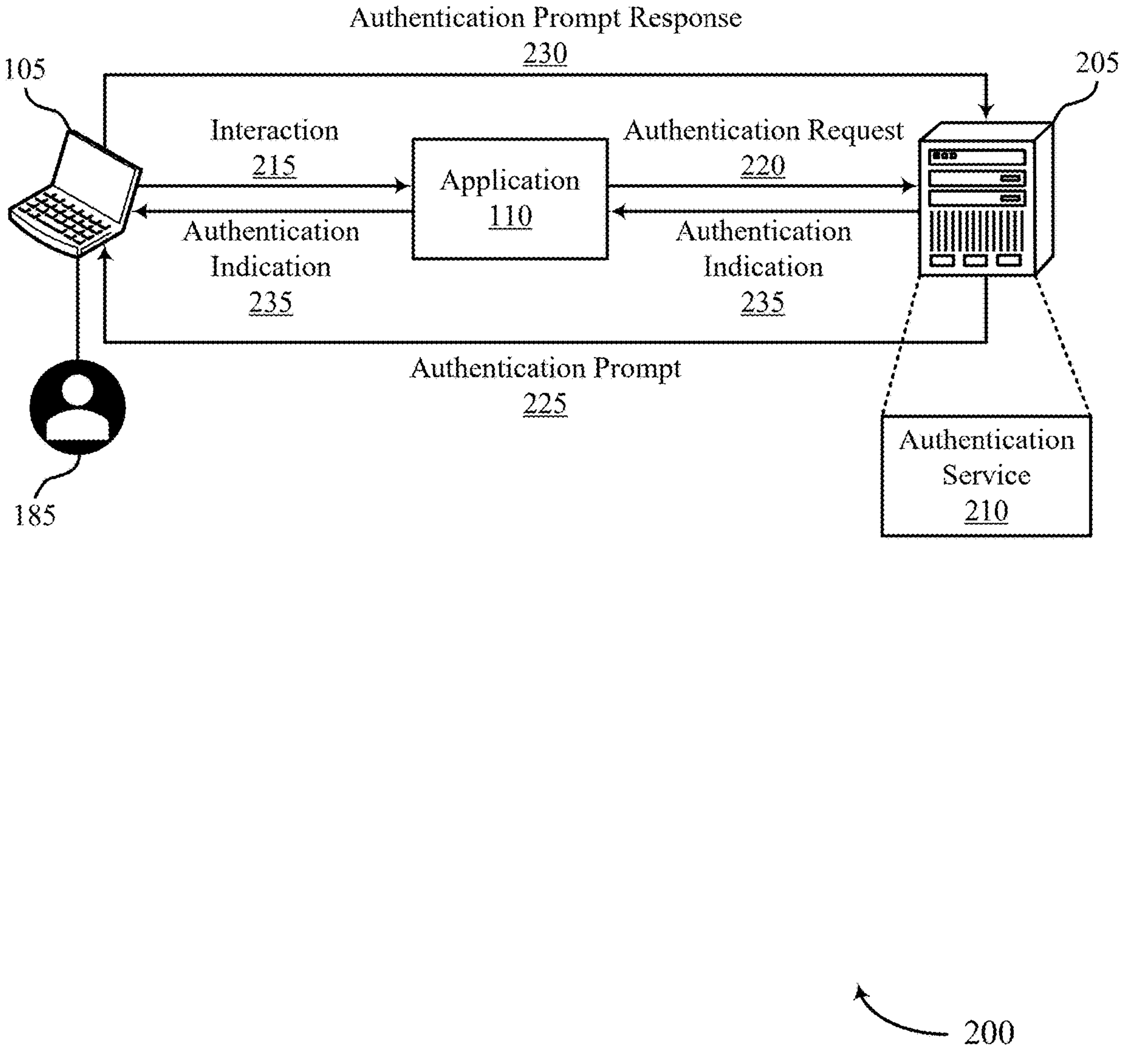

FIG. 2 shows an example of a computing system 200 that supports secure contextual information retrieval for authentication messaging in accordance with aspects of the present disclosure. In some examples, the computing system 200 may implement or be implemented by the computing system 100. For example, the computing system 200 may include a computing device 105 that a user 185 can use to access an application 110, which may be examples of devices or services described with reference to FIG. 1. Further, the application 110 may communicate with an authentication server 205 and an authentication service 210 to authenticate interactions 215 as an application 110.

In some examples, users 185 may be requested to authenticate interactions 215 at an application 110. For example, a user 185 may be on a phone call with a call center and a customer service representative may request to access personal information associated with the user 185. In such examples, the user 185 may receive a request to authorize the interaction 215 of accessing the personal information of the user 185 via push notification on the computing device 105 of the user 185. In another example, the user 185 may initiate a sensitive transaction (e.g., a transfer of money from a bank account of the user 185) on a relatively insecure device via an application 110 associated with the bank or financial institution that the bank account of the user 185 belongs to. In response, the application 110 may trigger the user 185 to respond to a push notification on the application 110 of the user 185 to authorize the sensitive transaction.

In some cases, applications 110 may utilize a client initiated backchannel authentication flow for authentication of interactions 215. In some examples, a backchannel authentication flow may include an application 110 transmitting an authentication request 220 to the authentication server 205 to initiate a backchannel authentication procedure. Further, in some cases, a client initiated backchannel authentication flow may enable the authentication to occur at an authentication device. For example, the client initiated backchannel authentication flow may refrain from the application 110 redirecting a user 185 to perform a login or authentication process and instead the application 110 may directly communicate with the authentication server 205 via a backchannel request to initiate the authentication flow. For example, the application 110 may transmit the authentication request 220 to a backchannel authentication endpoint at the authentication server 205.

Further, to indicate a user 185 that the authentication is being requested for, the authentication request 220 may include an indication of an identifier (ID) token that is associated with user 185. In response, the authentication server 205 may validate the authentication request 220 and the user identity by utilizing the authentication service 210. In some cases, the authentication service 210 may be associated with a store of authentication information for users 185. For example, the authentication server 205 may validate the identity of a user 185 by having the authentication service 210 identify whether there is an account of the application 110 associated with the user 185. Thus, based on the authentication service 210 of the authentication server 205 validating the authentication request 220 and the identity of the user 185, the authentication server 205 may transmit a backchannel authentication response to the application 110 that includes an authentication request ID. Therefore, the backchannel authentication may enable an authentication flow where the authentication occurs via an authorization device (e.g., the computing device 105) rather than a consumption device (e.g., the application 110). In some cases, the application 110 may be referred to as a consumption device based on being the device that receives IDs and access tokens and the computing device 105 may be referred to as an authorization device based on the user 185 verifying the interaction 215 at the computing device 105 and in communication with the authentication server 205.

Further, after the backchannel authentication procedure being initiated, the authentication server 205 may then transmit an authentication prompt 225 to the computing device of the user 185 to request the user 185 to approve or deny the interactions 215 at the application 110. In some examples, the authentication server 205 may transmit the authentication prompt 225 to the computing device 105 via a push message or push notification. For example, if the application 110 is associated with a bank or financial institution, the interaction 215 may be a purchase attempt of a product with a relatively high monetary value (e.g., a relatively expensive product with a monetary cost above a threshold) or the financial institution may detect an unusual or suspicious purchase attempt. Thus, in response to the financial institution detecting the interaction 215, the financial institution may request that the owner of the account (e.g., the user 185) authenticate the interaction 215.

To authenticate the interaction 215, the authentication server 205 may transmit the authentication prompt 225 and request the user 185 to provide an authentication prompt response 230 that indicates whether the user 185 accepts or denies the request. In some cases, if the user 185 recognizes the interaction 215 (e.g., the user 185 recognizes the purchase transaction) the user 185 may authenticate the interaction 215 and the authentication server 205 may transmit an authentication indication 235 to the application 110 to indicate the authentication of the interaction 215. In some other cases, if the user 185 is unable to recognize the interaction 215, the user 185 may refrain from authenticating the interaction 215 and the authentication server 205 may indicate as such to the application 110 via the authentication indication 235. Moreover, the application 110 may then forward the authentication indication 235 to the computing device 105 of the user 185 to indicate whether the interaction 215 was successful. Additionally, or alternatively, the computing device 105 associated with the interaction 215 and the computing device 105 that receives the authentication prompt 225 may be the same computing device 105 or different computing devices 105. For example, the interaction 215 may be the user 185 attempting to purchase a product on a website via a computing device 105 that is a laptop, desktop computer, or the like, and the user 185 may receive an authentication prompt 225 on a computing device 105 that is a mobile device owned by the user 185. As such, the authentication server 205 may ensure that a genuine user 185 receives the authentication prompt 225 in a case where the interaction 215 is performed by a malicious user 185.

However, in some examples, the user 185 may be unable to determine the context of the interaction 215 that the authentication server 205 is requesting the user 185 to authorize via the authentication prompt 225 and thus may be unable to accurately authenticate the interaction 215. For example, the authentication prompt 225 may transmitted via a push message or notification and as a result the authentication server 205 may only be capable of transmitting a relatively small quantity of data via the push message. In another example, if the authentication server 205 requests the user 185 to authenticate the interaction 215 via a push message on the computing device 105, a fraudulent user 185 with access to the computing device 105 may be capable of transmitting the authentication prompt response 230. For example, a user 185 may lose a credit card and the computing device 105 associated with the user 185 and a fraudulent or malicious user 185 may obtain the credit card and the computing device 105. Therefore, when the fraudulent or malicious user 185 uses the credit card to attempt to make a relatively large purchase that the financial institution of the credit card deems as unusual or suspicious, the fraudulent or malicious user 185 may be able to transmit the authentication prompt response 230 in response to the authentication prompt 225 to authorize the interaction 215. For example, since the financial institution may assume that the computing device 105 is in the possession of the owner of the computing device 105, if the computing device 105 transmits the authentication prompt response 230 in response to the authentication prompt 225, the authentication server 205 may deem the user 185 as authenticated to authorize the interaction 215. Therefore, fraudulent or malicious users 185 may be capable of acting as a genuine user 185 with relative ease due to the lack of security of a push message or notification.

To improve the security of the authentication procedure, the techniques of the present disclosure may describe a secure retrieval of contextual information of the interaction 215 for the user 185 to authenticate. For example, in response to receiving the push message from the authentication server 205 requesting for the user 185 to authenticate the interaction 215, the user 185 may be prompted to provide login credentials to the application 110 associated with the interaction before being able to authenticate the interaction 215. Moreover, the authentication request 220 may also include an identifier associated with a set of contextual information associated with the interaction 215 for the user 185 to view when determining whether to authenticate the interaction 215. Thus, after successfully accessing the application 110, the user 185 may request the contextual information associated with the interaction 215 using the received identifier and receive the contextual information from the authentication server 205 in a secure manner within the application 110. Additionally, or alternatively, the request for the contextual information may be combined with the request to access the application 110 such that when a user 185 successfully accesses the application 110, the user 185 requests for the contextual information automatically. Therefore, after accessing the application 110, the user 185 may view the contextual information within the application 110 to determine whether to authenticate the interaction 215. For example, if the interaction 215 is a purchase attempt, the authentication server 205 may transmit a set of contextual information indicating the time of the purchase attempt, a location of the purchase attempt, an amount of the purchase, and the like for the user 185 to view. Thus, the techniques of the present disclosure may enable the user 185 the capability of making a relatively more informed decision when authenticating an interaction 215 at the application 110 resulting in the computing system 200 being more reliable and secure. Further descriptions of the techniques of the techniques of the present disclosure may be described elsewhere herein, such as with reference to FIG. 3. For example, FIG. 3 may illustrate a process flow of an authentication procedure where a user 185 requests for a set of contextual information associated with an interaction 215 at an application 110 from an authentication server 205 to determine whether to authenticate the interaction 215.

Figure 3:
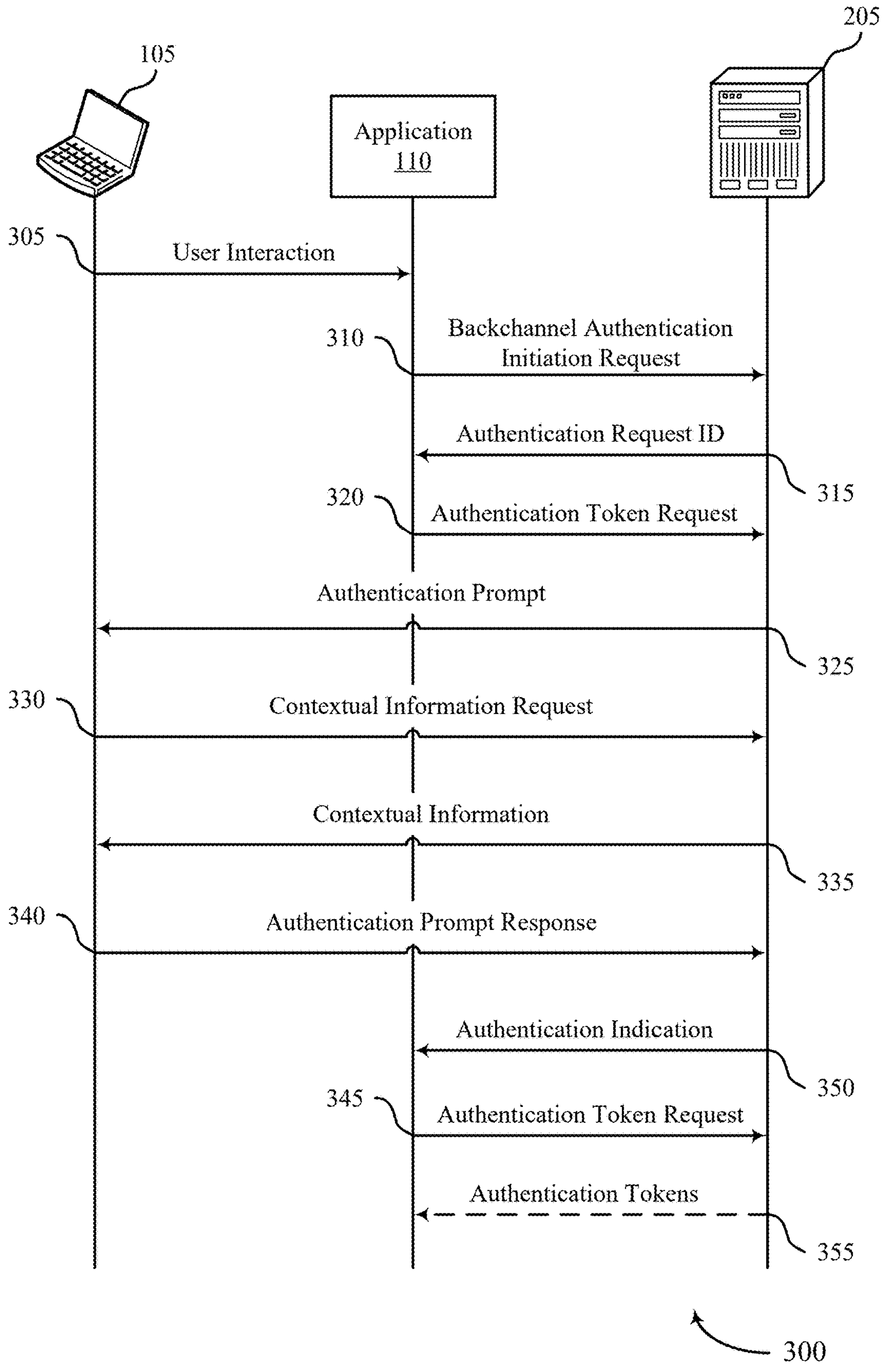
FIG. 3 shows an example of a process flow that supports secure contextual information retrieval for authentication messaging in accordance with aspects of the present disclosure.

FIG. 3 shows an example of a process flow 300 that supports secure contextual information retrieval for authentication messaging in accordance with aspects of the present disclosure. In some examples, the process flow 300 may implement or may be implemented by the computing system 100, the computing system 200, or a combination thereof. The process flow 300 may include a computing device 105, an application 110, and the authentication server 205, which may be examples of devices or services described elsewhere herein including with reference to FIG. 1.

In the following description of the process flow 300, the operations may be performed by the computing device 105, the application 110, and the authentication server 205 in different orders or at different times. Some operations may also be left out of the process flow 300, or other operations may be added. Although the process flow 300 may be described as being performed by the computing device 105, the application 110, and the authentication server 205, some aspects of some operations may also be performed by other devices, services, or models described elsewhere herein including with reference to FIGS. 1 through 2.

At 305, the application 110 may receive, from a first user 185 of the computing device 105, an interaction at the application 110. For example, the first user 185 of the computing device 105 may perform one or more actions that triggers the application 110 to authenticate an interaction with the application 110 (e.g., the interaction 215 described with reference to FIG. 2). Thus, at 310, the authentication server 205 may receive, from the application 110 (e.g., a first application 110), a first request to initiate a backchannel authentication procedure (e.g., a client initiated backchannel authentication flow) that is associated with an interaction by a first user 185 with the application 110. Moreover, the first request from the application 110 may include an indication of the interaction. For example, the first request may include a set of contextual information associated with the interaction at the application 110. In some cases, the set of contextual information may include a textual message to be displayed to a user 185, an audience identifier and a list of requested scopes, a block of data within a JavaScript object notation (JSON) format indicating information of the interaction, or any combination thereof. Moreover, the information within the set of contextual information may include an indication of what the interaction is, the application 110 associated with the interaction, a time of the interaction, a geographical location of the interaction, and the like. Additionally, or alternatively, after receiving the first request, the authentication server 205 may store the set of contextual information at the authentication server 205 and assign the set of contextual information a random identifier that may be referred to as a linking ID.

Further, in some examples, the first request may be referred to as a client initiated backchannel authentication request. In some cases, a developer user 185 may enable an application 110 to initiate a client initiated backchannel authentication on a per-tenant basis. For example, an administrator of an organization or tenant may enable the application 110 with the capability of initiating a client initiated backchannel authentication procedure. For example, the administrator may enable the client initiated backchannel authentication as a grant type for the application 110. Further, in some cases, for the authentication server 205 to accept the first request at 310, the first user 185 may have to be enrolled in an MFA service (e.g., the MFA service 160 described with reference to FIG. 1). In some examples, the administrator of a tenant may enroll each user 185 of the organization or tenant within the MFA service 160 and may enable push notifications for each user 185. For example, to transmit the client initiated backchannel authentication request, the application 110 may be expected to include a user ID for the user 185 that the authentication request is for. In some cases, the user ID may be based on the user 185 being enrolled in MFA push factor. Further, the application 110 may use a user 185 search API to identify and obtain the user ID for a respective user 185. Based on obtaining the user ID for the respective user 185, the application 110 may then transmit the backchannel authorization endpoint (e.g., a bc-authorize endpoint) at the authentication server 205 via a POST request. In some examples, the POST message may include one or more parameters such as a client ID, a client secret, a login hint, a scope parameter, and the like. Additionally, or alternatively, with the request to initiate the backchannel authentication procedure, At 315, if contents of the POST request to initiate the backchannel authentication procedure are valid, the authentication server 205 may transmit, to the application 110, an authentication request identifier (e.g., an auth_req_id). In some examples, the application 110 may be able to use the authentication request identifier to reference the first request. Moreover, the application 110 may store the authentication request identifier and attempt to exchange the authentication request identifier for one or more authentication tokens at a token endpoint at the authentication server 205 (e.g., a /token endpoint). For example, at 320, the application 110 may transmit, to the authentication server 205, a request for one or more authentication tokens where the request includes the authentication request identifier received at 315. In some examples, the authentication server 205 may refrain from providing a response to the request from the application 110 for the one or more authentication tokens prior to receiving an indication of whether the interaction at the application 110 is authenticated. For example, until the user 185 authorizes the interaction and the interaction is authenticated, the application 110 may receive an error message indicating that authorization is pending. In such cases, the application 110 may continue to transmit the request for the one or more authentication tokens until an acceptance or denial message is received.

At 325, the authentication server 205 may transmit, to the first user 185 of the computing device 105 a second request to authenticate the interaction at the first application 110 indicated via the first request from the first application 110. Moreover, the second request may include an identifier for a set of contextual information associated with the interaction. In some examples, as described elsewhere herein, the identifier for the set of contextual information may be referred to as a linking ID (e.g., a linking_id) and the identifier may be a randomly generated identifier. Further, in some cases, the authentication server 205 may transmit the second request to the computing device 105 of the first user 185 via a push notification message. Moreover, the push notification message may include the identifier for the set of contextual information (e.g., the linking ID) associated with the interaction and an access token that is associated with a device key. Further, the device key may be associated with the computing device 105 that is operated by the first user 185. Additionally, or alternatively, the device key may be referred to as a private key that the authentication server 205 is aware belongs to the computing device 105 of the first user 185. In some examples, the access token may be linked to the private key of the computing device 105 via a linking mechanism that is associated with a cryptographic hash of a public key of the computing device 105. Therefore, to obtain the access token that is associated with the private key of the computing device 105 the computing device 105 may have to have access to the cryptographic hash of a public key which may be a relatively difficult value to guess randomly. Thus, by using a cryptographic hash of a public key, the techniques of the present disclosure may ensure that only the actual owner of the public key and private key of the computing device 105 is capable of utilizing the access token indicated via the push notification message from the authentication server 205.

In some examples, the computing device 105 that receives the second request to authenticate the interaction at the first application 110 may be a different computing device than a computing device 105 associated with the interaction or the same computing device 105. For example, the interaction may be an attempt to purchase a product and the application may be a bank or financial institution that is requesting for a user 185 to authenticate the purchase. In some cases, the purchase attempt may be from a computing device 105 such as a laptop and the second request to authenticate the interaction may be transmitted to a computing device 105 such as a mobile phone of the first user 185 associated with the bank account. Therefore, if the computing device 105 associated with the interaction is owned or operated by a different user 185 (e.g., a malicious or fraudulent user), the authentication server 205 may ensure that a legitimate user 185 receives the second request at 325.

At 330, the authentication server 205 may receive, from the first user 185, a third request for the set of contextual information associated with the interaction where the third request includes the identifier for the set of contextual information received at 325. In some examples, the first user 185 may transmit the third request by based on accessing the application 110 associated with the interaction. For example, the second request to authenticate the interaction at the first application 110 from the authentication server 205 may prompt the first user 185 to access the first application 110. Further, to access the first application 110, the first user 185 may have to provide a set of login credentials for the application 110. In some cases, the set of login credentials may include biometric information (e.g., fingerprints, facial scans, and the like), a username and password, a one-time key or password, or any combination thereof. Therefore, the authentication server 205 may transmit the set of contextual information to the first user 185 based on the first user 185 successfully accessing the first application 110 associated with the interaction.

Additionally, or alternatively, the third request for the set of contextual information may also include the access token indicated via the second request and a proof-of-possession indication. In some examples, to obtain the proof-of-possession indication, the computing device 105 may perform a demonstration proof of possession (DPoP) mechanism that enables the computing device 105 the capability of proving that the computing device 105 possess and owns the public key and private key of the computing device 105. Thus, the proof-of-possession indication may be a DPoP proof that demonstrates to the authentication server 205 that the computing device 105 owns the private key that is used to sign the DPoP proof. Therefore, the DPoP proof may enable the authentication server 205 to issue tokens to the corresponding public key of the computing device 105 while preventing the issuance of tokens to a computing device 105 that does not have access to the private key. Thus, utilizing a DPoP proof may ensure that a fraudulent user 185 of a computing device 105 is unable to receive the set of contextual information associated with the interaction.

In some cases, a DPoP proof may include a set of data that includes an address (e.g., a uniform resource locator (URL) address) associated with the linking ID. For example, the URL may be a URL associated with the linking ID endpoint (e.g., /rich-consents/:linking_ID) and the URL may include the linking ID which may be relatively difficult for a fraudulent user to guess or obtain as the linking ID is randomly generated. Moreover, the DPoP proof may also include a digital signature that is generated using the private key of the computing device 105 of the first user 185 that receives the authentication prompt via the second request.

Further, in some examples, the third request for the set of contextual information may be a HTTP GET request that the computing device 105 transmits to a linking ID endpoint at the authentication server 205 (e.g., a /rich-consents/:linking_ID endpoint). Therefore, at 335, based on the computing device 105 including the identifier for the set of contextual information, the access token received from the authentication server 205, and the proof-of-possession indication (e.g., the DPoP proof that is indicated via a MFA-DPoP header of the HTTP GET request), the authentication server 205 may be capable of transmitting (e.g., returning in response to the request) the set of contextual information associated with the interaction at the application 110. For example, the authentication server 205 may transmit, to the first user 185, the set of contextual information associated with the interaction based on the third request including the identifier for the set of contextual information. Moreover, the authentication server 205 may transmit the set of contextual information to the first user 185 based on set of login credentials indicated via the third request being associated with the first application 110 and based on authentication of the access token and the proof-of-possession indication indicated via the third request. Therefore, if the user 185 requesting the set of contextual information is a fraudulent user and any one of the items included in the third request are non-authenticated, the authentication server 205 may refrain from transmitting the set of contextual information to the user 185. However, if each item is authenticated, the authentication server 205 may transmit the set of contextual information to the first user 185 for display within the first application 110. Thus, the authentication server 205 may only transmit the set of contextual information to the user 185 and the computing device 105 that is the owner of the private key associated with the access key received via the second request and to the user 185 and computing device 105 that actually received the linking ID. For example, since the linking ID is a randomly generated identifier, a fraudulent user may be unable to randomly guess the value of the identifier and the authentication server 205 may refrain from transmitting the set of contextual information to a user 185 that provides an incorrect linking ID.

In some cases, to verify the third request for the set of contextual information, the authentication server 205 may determine whether the digital signature of the DPoP proof indicated via the third request. For example, the authentication server 205 may use a public key of the computing device 105 that is previously stored at the authentication server 205 to validate the DPoP proof signature that is generated using the private key of the computing device 105. Moreover, as the linking ID may be relatively difficult to guess or obtain by a malicious user, a malicious user may be unable to generate a valid DPoP proof even if the malicious user obtains the private key of the computing device 105. Thus, the authentication server 205 may ensure whether the third request is from a legitimate user by authenticating and verifying the DPoP proof that includes the URL with the linking ID and a digital signature associated with the private key of the computing device 105.

Further, based on the first user 185 successfully accessing the first application 110 after receiving the second request to authenticate the interaction at the application 110, the first application 110 may display the set of contextual information to the first user 185. For example, the first application 110 may display a textual message indicating the set of contextual information associated with the interaction. Thus, based on viewing the set of contextual information, the first user 185 may determine whether to authenticate and authorize the interaction at the application 110. For example, in some cases, the first user 185 may determine that the interaction was performed by a fraudulent or malicious user and may thus deny the authentication request or refrain from authenticating the interaction. In some other cases, if the first user 185 determines that the interaction is authentic and was performed or initiated by the first user 185, the first user 185 may accept the authentication request from the authentication server 205.

Thus, at 340, the authentication server 205 may receive, from the first user 185 and in response to the second request (e.g., the request to authenticate the interaction at the first application 110), an indication of whether the interaction at the first application 110 is authenticated based on the authentication server 205 transmitting the set of contextual information to the first user 185. In some examples, the indication may indicate that the interaction at the first application 110 is authenticated. In some other examples, the indication may indicate that the first user 185 refrained from or denied authenticating the interaction at the first application 110. Moreover, at 345, the authentication server 205 may transmit, to the first application 110, the indication of whether the first user 185 authenticated the interaction at the first application 110 based on receiving the indication from the first user 185.

At 350, the first application 110 may transmit another request (e.g., a fourth request) for the one or more authentication tokens that includes the authentication request identifier received at 315. In some cases, while the authentication server 205 is waiting to receive the indication of whether the interaction at the first application 110 is authenticated by the first user 185, the application 110 may continue to transmit requests for the one or more authentication tokens. In some examples, the authentication server 205 may be unable to receive a response from the first user 185 before the expiration of a timer. Thus, the authentication server 205 may transmit, to the first application 110, an authentication expiration indication based on an expiration of a timer associated with receiving the indication from the first user 185 of whether the interaction at the first application 110 is authenticated. Further, the authentication expiration indication may also include a denial of authentication of the interaction at the first application 110.

At 355, the authentication server 205 may transmit, to the first application 110, the one or more authentication tokens based on the interaction at the first application 110 being authenticated. In some cases, the authentication server 205 may transmit the one or more authentication tokens in response to the fourth request for the one or more authentication tokens. For example, the authentication server 205 may transmit, to the first application 110 and subsequent to receiving the indication of whether the interaction at the first application is authenticated, the one or more authentication tokens in response to the fourth request based on the first user 185 authenticating the interaction at the first application 110. In some other cases, if the first user 185 denied the authentication request from the authentication server 205 to authenticate the interaction at the first application 110, the authentication server 205 may refrain from transmitting the one or more authentication tokens and may transmit an access denied indication. In some examples, the access denied indication and the authentication expiration indication may be the same or different.

Thus, the techniques of the present disclosure, may ensure that the first user 185 of the computing device 105 is capable of making an informed decision to authenticate or refrain from authenticating the interaction at the first application 110. For example, by enabling the authentication server 205 to provide the set of contextual information, the first user 185 may be capable of determining whether the first user 185 performed or initiated the interaction. Additionally, or alternatively, by ensuring that the first user 185 is authenticated before transmitting the set of contextual information to the first user 185, the techniques of the present disclosure may ensure that the authentication server 205 transmits the set of contextual information to a genuine and authenticated user 185. Therefore, the techniques of the present disclosure may result in an increase in security for a computing system (e.g., the computing system 100, the computing system 200, or both) which can result in an increase in reliability of the computing system. Further descriptions of the techniques of the present disclosure may be described elsewhere herein, such as with reference to FIGS. 4 through 7.

Figure 4:
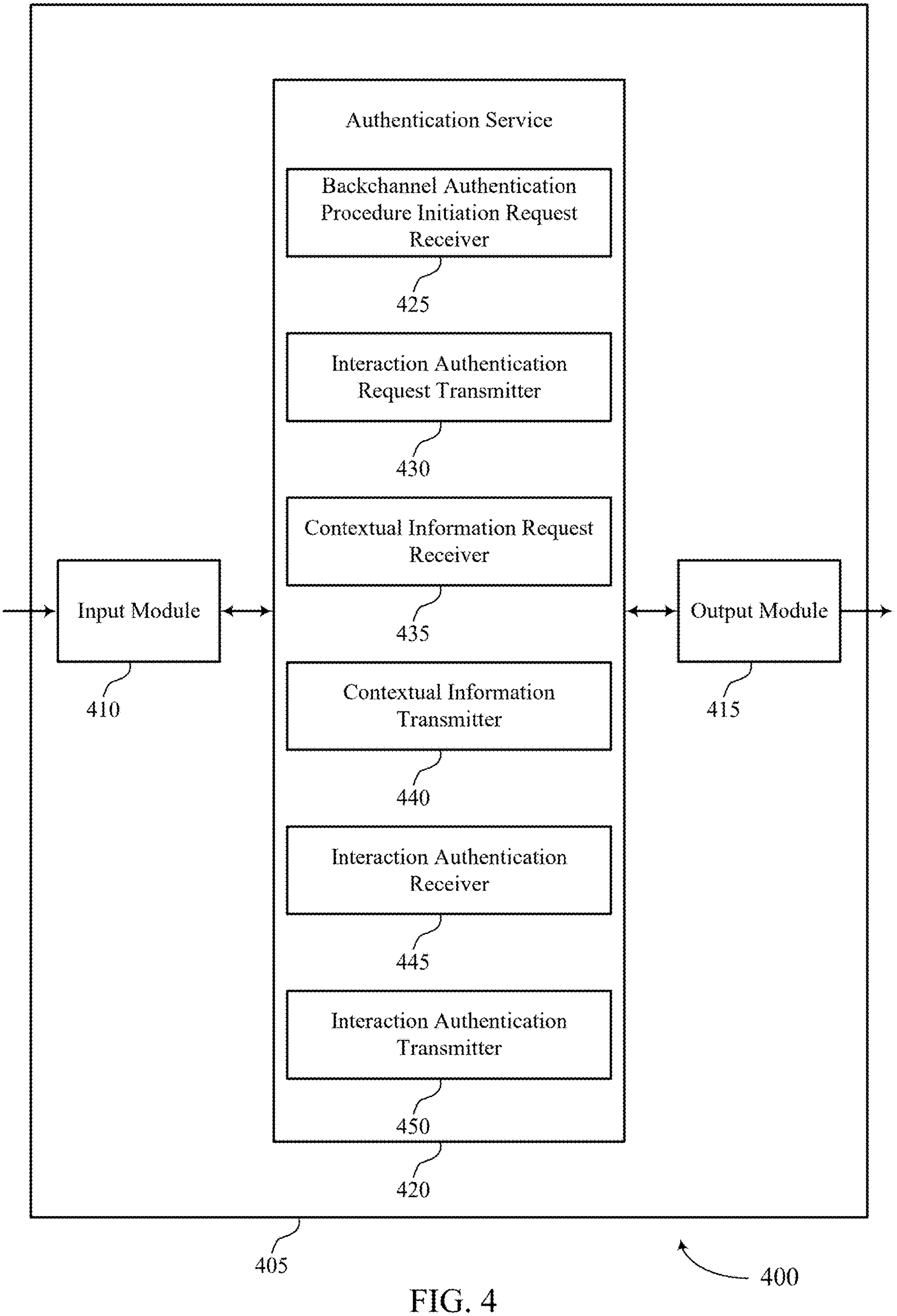
FIG. 4 shows a block diagram of an apparatus that supports secure contextual information retrieval for authentication messaging in accordance with aspects of the present disclosure.

FIG. 4 shows a block diagram 400 of a device 405 that supports secure contextual information retrieval for authentication messaging in accordance with aspects of the present disclosure. The device 405 may include an input module 410, an output module 415, and an authentication service 420. The device 405, or one or more components of the device 405 (e.g., the input module 410, the output module 415, the authentication service 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the authentication service 420 to support secure contextual information retrieval for authentication messaging. In some cases, the input module 410 may be a component of an input/output (I/O) controller 610 as described with reference to FIG. 6.

The output module 415 may manage output signals for the device 405. For example, the output module 415 may receive signals from other components of the device 405, such as the authentication service 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the authentication service 420 may include a backchannel authentication procedure initiation request receiver 425, an interaction authentication request transmitter 430, a contextual information request receiver 435, a contextual information transmitter 440, an interaction authentication receiver 445, an interaction authentication transmitter 450, or any combination thereof. In some examples, the authentication service 420, or various components thereof, may be configured to perform various operations (e.g., receiving, monitoring, transmitting) using or otherwise in cooperation with the input module 410, the output module 415, or both. For example, the authentication service 420 may receive information from the input module 410, send information to the output module 415, or be integrated in combination with the input module 410, the output module 415, or both to receive information, transmit information, or perform various other operations as described herein.

The authentication service 420 may support backchannel authentication in accordance with examples as disclosed herein. The backchannel authentication procedure initiation request receiver 425 may be configured to support receiving, from a first application, a first request to initiate a backchannel authentication procedure associated with an interaction by a first user with the first application, the first request including an indication of the interaction. The interaction authentication request transmitter 430 may be configured to support transmitting, to the first user, a second request to authenticate the interaction at the first application indicated via the first request, the second request including an identifier for a set of contextual information associated with the interaction. The contextual information request receiver 435 may be configured to support receiving, from the first user, a third request for the set of contextual information associated with the interaction, the third request including the identifier for the set of contextual information. The contextual information transmitter 440 may be configured to support transmitting, to the first user, the set of contextual information associated with the interaction based on the third request including the identifier for the set of contextual information. The interaction authentication receiver 445 may be configured to support receiving, from the first user and in response to the second request, an indication of whether the interaction at the first application is authenticated based on transmitting the set of contextual information. The interaction authentication transmitter 450 may be configured to support transmitting, to the first application, the indication based on receiving the indication from the first user.

Figure 5:
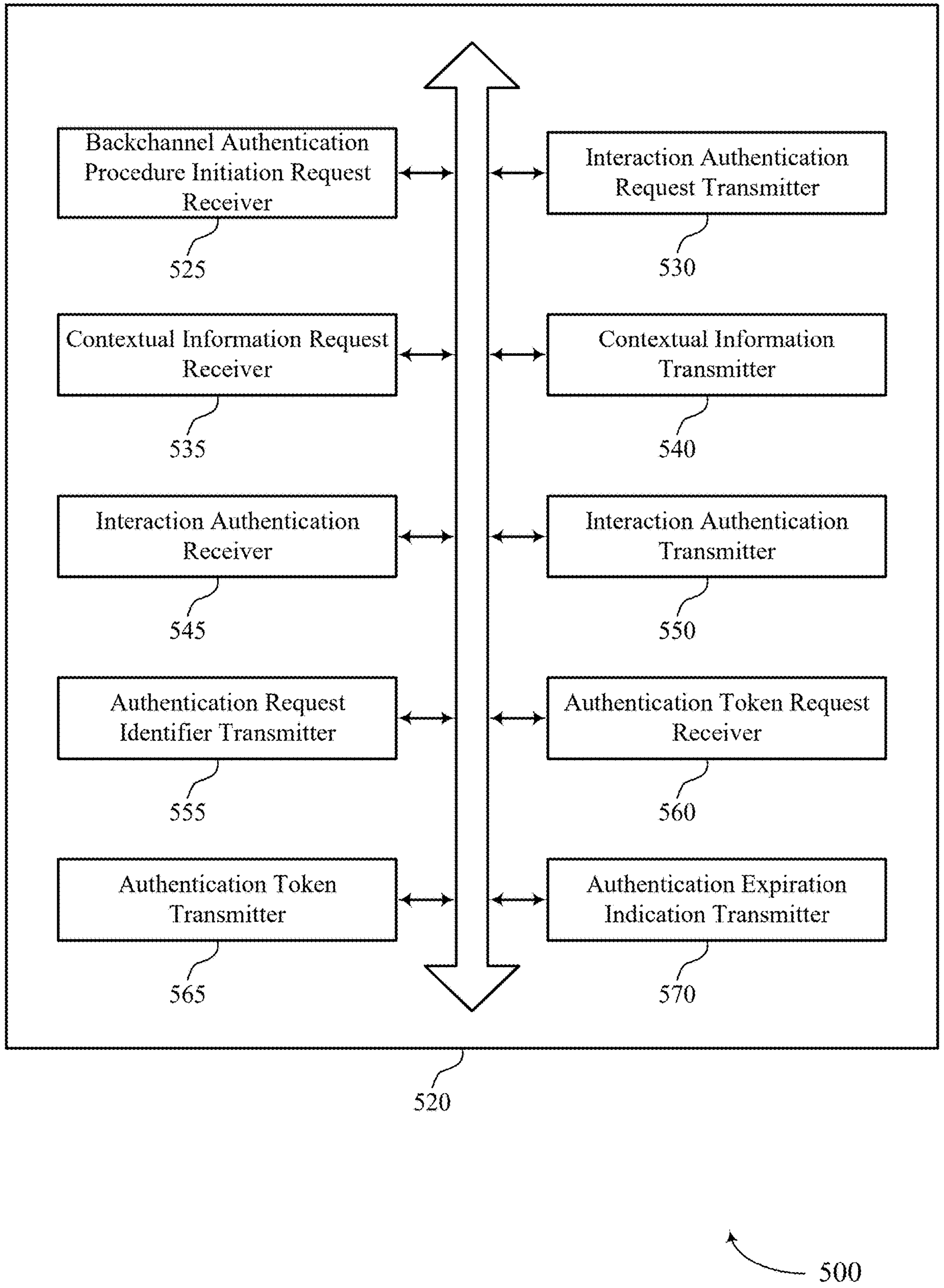
FIG. 5 shows a block diagram of an authentication service that supports secure contextual information retrieval for authentication messaging in accordance with aspects of the present disclosure.

FIG. 5 shows a block diagram 500 of an authentication service 520 that supports secure contextual information retrieval for authentication messaging in accordance with aspects of the present disclosure. The authentication service 520 may be an example of aspects of an authentication service or an authentication service 420, or both, as described herein. The authentication service 520, or various components thereof, may be an example of means for performing various aspects of secure contextual information retrieval for authentication messaging as described herein. For example, the authentication service 520 may include a backchannel authentication procedure initiation request receiver 525, an interaction authentication request transmitter 530, a contextual information request receiver 535, a contextual information transmitter 540, an interaction authentication receiver 545, an interaction authentication transmitter 550, an authentication request identifier transmitter 555, an authentication token request receiver 560, an authentication token transmitter 565, an authentication expiration indication transmitter 570, or any combination thereof. Each of these components, or components of subcomponents thereof (e.g., one or more processors, one or more memories), may communicate, directly or indirectly, with one another (e.g., via one or more buses).

The authentication service 520 may support backchannel authentication in accordance with examples as disclosed herein. The backchannel authentication procedure initiation request receiver 525 may be configured to support receiving, from a first application, a first request to initiate a backchannel authentication procedure associated with an interaction by a first user with the first application, the first request including an indication of the interaction. The interaction authentication request transmitter 530 may be configured to support transmitting, to the first user, a second request to authenticate the interaction at the first application indicated via the first request, the second request including an identifier for a set of contextual information associated with the interaction. The contextual information request receiver 535 may be configured to support receiving, from the first user, a third request for the set of contextual information associated with the interaction, the third request including the identifier for the set of contextual information. The contextual information transmitter 540 may be configured to support transmitting, to the first user, the set of contextual information associated with the interaction based on the third request including the identifier for the set of contextual information. The interaction authentication receiver 545 may be configured to support receiving, from the first user and in response to the second request, an indication of whether the interaction at the first application is authenticated based on transmitting the set of contextual information. The interaction authentication transmitter 550 may be configured to support transmitting, to the first application, the indication based on receiving the indication from the first user.

In some examples, to support transmitting the indication, the interaction authentication transmitter 550 may be configured to support transmitting, to the first application, one or more authentication tokens based on the interaction at the first application being authenticated.

In some examples, to support transmitting the indication, the interaction authentication transmitter 550 may be configured to support transmitting, to the first application, a first indication that the first user authenticated the interaction at the first application or a second indication that the first user denied authenticating the interaction at the first application.

In some examples, to support transmitting the second request, the interaction authentication request transmitter 530 may be configured to support transmitting the second request via a push notification message, the push notification message including the identifier for the set of contextual information associated with the interaction and an access token that is associated with a device key, the device key being associated with a device operated by the first user.

In some examples, to support transmitting the second request via the push notification message, the interaction authentication request transmitter 530 may be configured to support transmitting, via the push notification message, a request to access the first application, the request to access the first application including a request for a set of login credentials associated with the first application and the first user. In some examples, to support transmitting the second request via the push notification message, the contextual information request receiver 535 may be configured to support receiving, from the first application via the third request, the identifier for the set of contextual information, the set of login credentials, the access token indicated via the second request, and a proof-of-possession indication. In some examples, to support transmitting the second request via the push notification message, the contextual information transmitter 540 may be configured to support transmitting, to the first user, the set of contextual information associated with the interaction based on the set of login credentials indicated via the third request being associated with the first application and the first user and on authentication of the access token and the proof-of-possession indication.

In some examples, the identifier for the set of contextual information is a randomly generated identifier.

In some examples, the authentication request identifier transmitter 555 may be configured to support transmitting, to the first application and in response to the first request, an authentication request identifier. In some examples, the authentication token request receiver 560 may be configured to support receiving, from the first application, a fourth request for one or more authentication tokens, the fourth request including the authentication request identifier. In some examples, the authentication token transmitter 565 may be configured to support refraining from providing a response to the fourth request prior to receiving the indication of whether the interaction at the first application is authenticated.

In some examples, the authentication token transmitter 565 may be configured to support transmitting, to the first application and subsequent to receiving the indication of whether the interaction at the first application is authenticated, the one or more authentication tokens in response to the fourth request based on the first user authenticating the interaction at the first application.

In some examples, the authentication expiration indication transmitter 570 may be configured to support transmitting, to the first application, an authentication expiration indication based on an expiration of a timer associated with receiving the indication from the first user of whether the interaction at the first application is authenticated, where the authentication expiration indication includes a denial of authentication of the interaction at the first application.

Figure 6:
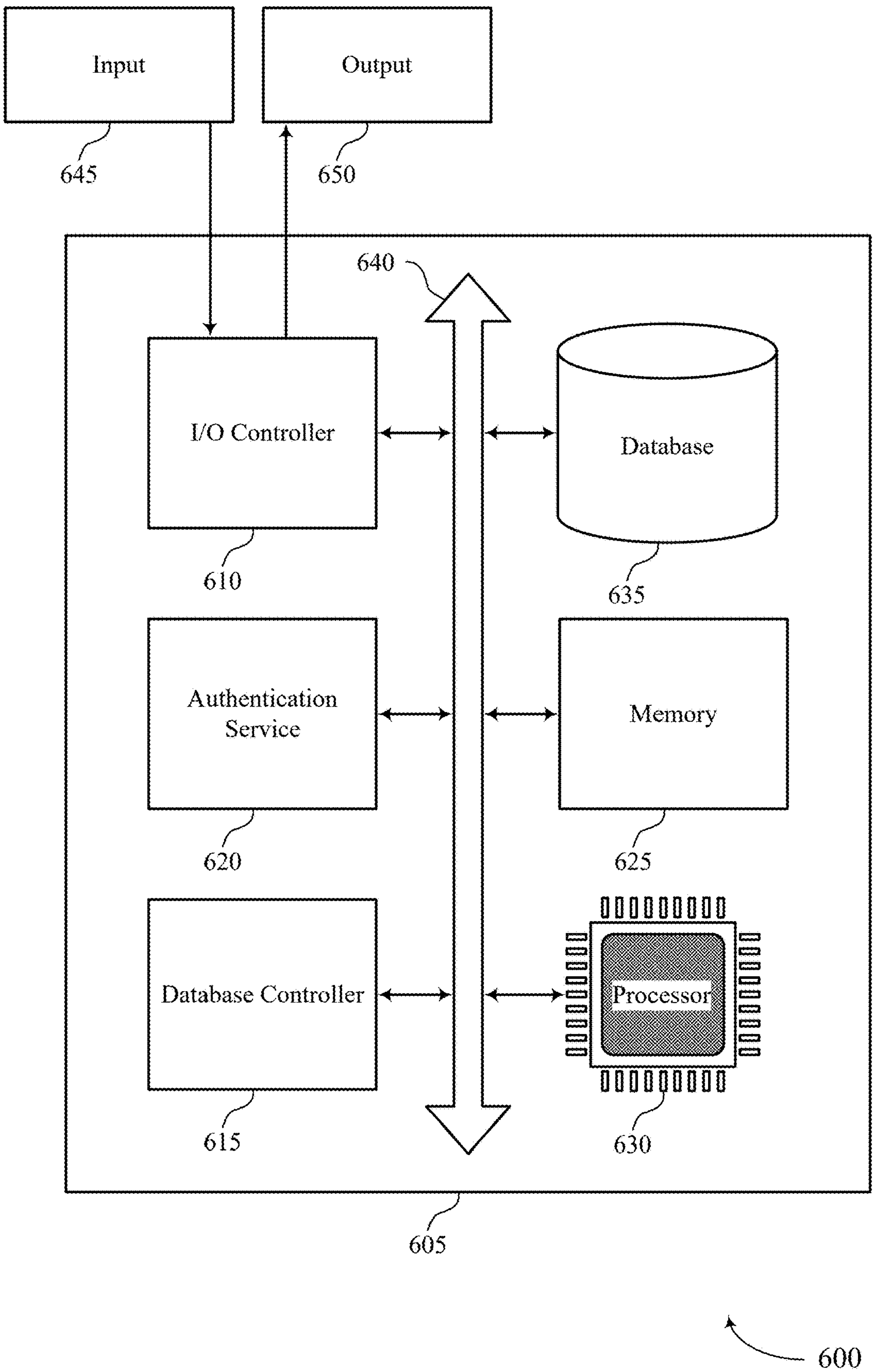
FIG. 6 shows a diagram of a system including a device that supports secure contextual information retrieval for authentication messaging in accordance with aspects of the present disclosure.

FIG. 6 shows a diagram of a system 600 including a device 605 that supports secure contextual information retrieval for authentication messaging in accordance with aspects of the present disclosure. The device 605 may be an example of or include components of a device 405 as described herein. The device 605 may include components for bi-directional voice and data communications including components for transmitting and receiving communications, such as an authentication service 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein.

In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting secure contextual information retrieval for authentication messaging). The processor 630 may be an example of a single processor or multiple processors. For example, the device 605 may include one or more processors 630.

The authentication service 620 may support backchannel authentication in accordance with examples as disclosed herein. For example, the authentication service 620 may be configured to support receiving, from a first application, a first request to initiate a backchannel authentication procedure associated with an interaction by a first user with the first application, the first request including an indication of the interaction. The authentication service 620 may be configured to support transmitting, to the first user, a second request to authenticate the interaction at the first application indicated via the first request, the second request including an identifier for a set of contextual information associated with the interaction. The authentication service 620 may be configured to support receiving, from the first user, a third request for the set of contextual information associated with the interaction, the third request including the identifier for the set of contextual information. The authentication service 620 may be configured to support transmitting, to the first user, the set of contextual information associated with the interaction based on the third request including the identifier for the set of contextual information. The authentication service 620 may be configured to support receiving, from the first user and in response to the second request, an indication of whether the interaction at the first application is authenticated based on transmitting the set of contextual information. The authentication service 620 may be configured to support transmitting, to the first application, the indication based on receiving the indication from the first user.

By including or configuring the authentication service 620 in accordance with examples as described herein, the device 605 may support techniques for an authentication server to provide more secure authentication requests to users to support improved security, improved reliability of authentication systems, and a decrease in security risks.

Figure 7:
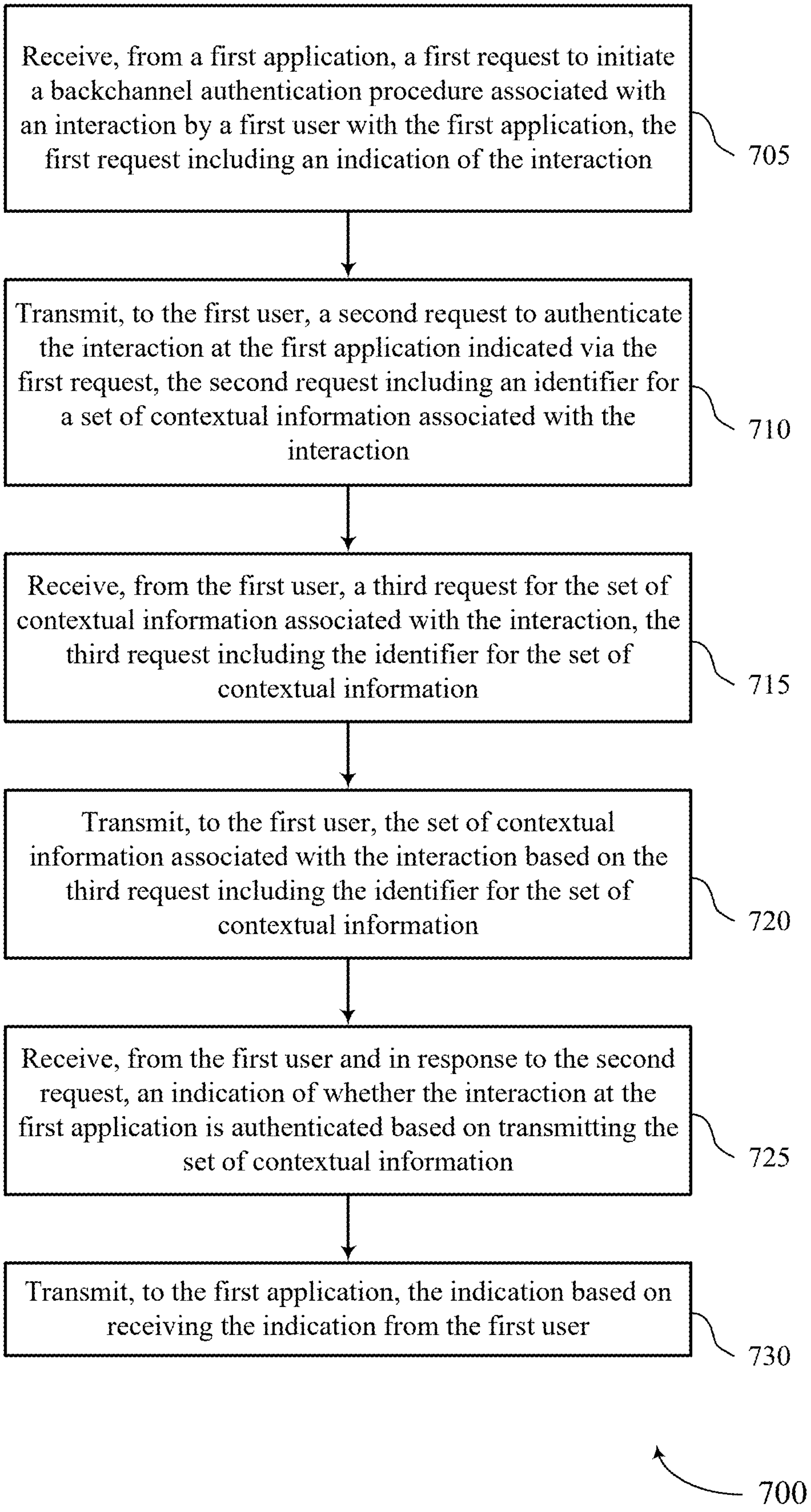
FIG. 7 shows a flowchart illustrating methods that support secure contextual information retrieval for authentication messaging in accordance with aspects of the present disclosure.

FIG. 7 shows a flowchart illustrating a method 700 that supports secure contextual information retrieval for authentication messaging in accordance with aspects of the present disclosure. The operations of the method 700 may be implemented by an authentication server or its components as described herein. For example, the operations of the method 700 may be performed by an authentication server as described with reference to FIGS. 1 through 6. In some examples, an authentication server may execute a set of instructions to control the functional elements of the authentication server to perform the described functions. Additionally, or alternatively, the authentication server may perform aspects of the described functions using special-purpose hardware.

At 705, the method may include receiving, from a first application, a first request to initiate a backchannel authentication procedure associated with an interaction by a first user with the first application, the first request including an indication of the interaction. The operations of 705 may be performed in accordance with examples as disclosed herein. In some examples, aspects of the operations of 705 may be performed by a backchannel authentication procedure initiation request receiver 525 as described with reference to FIG. 5.

At 710, the method may include transmitting, to the first user, a second request to authenticate the interaction at the first application indicated via the first request, the second request including an identifier for a set of contextual information associated with the interaction. The operations of 710 may be performed in accordance with examples as disclosed herein. In some examples, aspects of the operations of 710 may be performed by an interaction authentication request transmitter 530 as described with reference to FIG. 5.

At 715, the method may include receiving, from the first user, a third request for the set of contextual information associated with the interaction, the third request including the identifier for the set of contextual information. The operations of 715 may be performed in accordance with examples as disclosed herein. In some examples, aspects of the operations of 715 may be performed by a contextual information request receiver 535 as described with reference to FIG. 5.

At 720, the method may include transmitting, to the first user, the set of contextual information associated with the interaction based on the third request including the identifier for the set of contextual information. The operations of 720 may be performed in accordance with examples as disclosed herein. In some examples, aspects of the operations of 720 may be performed by a contextual information transmitter 540 as described with reference to FIG. 5.

At 725, the method may include receiving, from the first user and in response to the second request, an indication of whether the interaction at the first application is authenticated based on transmitting the set of contextual information. The operations of 725 may be performed in accordance with examples as disclosed herein. In some examples, aspects of the operations of 725 may be performed by an interaction authentication receiver 545 as described with reference to FIG. 5.

At 730, the method may include transmitting, to the first application, the indication based on receiving the indication from the first user. The operations of 730 may be performed in accordance with examples as disclosed herein. In some examples, aspects of the operations of 730 may be performed by an interaction authentication transmitter 550 as described with reference to FIG. 5.

The following provides an overview of aspects of the present disclosure:

Aspect 1: A method for backchannel authentication, comprising: receiving, from a first application, a first request to initiate a backchannel authentication procedure associated with an interaction by a first user with the first application, the first request comprising an indication of the interaction; transmitting, to the first user, a second request to authenticate the interaction at the first application indicated via the first request, the second request comprising an identifier for a set of contextual information associated with the interaction; receiving, from the first user, a third request for the set of contextual information associated with the interaction, the third request comprising the identifier for the set of contextual information; transmitting, to the first user, the set of contextual information associated with the interaction based at least in part on the third request comprising the identifier for the set of contextual information; receiving, from the first user and in response to the second request, an indication of whether the interaction at the first application is authenticated based at least in part on transmitting the set of contextual information; and transmitting, to the first application, the indication based at least in part on receiving the indication from the first user Aspect 2: The method of aspect 1, wherein transmitting the indication comprises: transmitting, to the first application, one or more authentication tokens based at least in part on the interaction at the first application being authenticated.

Aspect 3: The method of any of aspects 1 through 2, wherein transmitting the indication comprises: transmitting, to the first application, a first indication that the first user authenticated the interaction at the first application or a second indication that the first user denied authenticating the interaction at the first application.

Aspect 4: The method of any of aspects 1 through 3, wherein transmitting the second request comprises: transmitting the second request via a push notification message, the push notification message comprising the identifier for the set of contextual information associated with the interaction and an access token that is associated with a device key, the device key being associated with a device operated by the first user.

Aspect 5: The method of aspect 4, wherein transmitting the second request via the push notification message comprises: transmitting, via the push notification message, a request to access the first application, the request to access the first application comprising a request for a set of login credentials associated with the first application and the first user; receiving, from the first application via the third request, the identifier for the set of contextual information, the set of login credentials, the access token indicated via the second request, and a proof-of-possession indication; and transmitting, to the first user, the set of contextual information associated with the interaction based at least in part on the set of login credentials indicated via the third request being associated with the first application and the first user and on authentication of the access token and the proof-of-possession indication.

Aspect 6: The method of any of aspects 1 through 5, wherein the identifier for the set of contextual information is a randomly generated identifier.

Aspect 7: The method of any of aspects 1 through 6, further comprising: transmitting, to the first application and in response to the first request, an authentication request identifier; receiving, from the first application, a fourth request for one or more authentication tokens, the fourth request comprising the authentication request identifier; and refraining from providing a response to the fourth request prior to receiving the indication of whether the interaction at the first application is authenticated.

Aspect 8: The method of aspect 7, further comprising: transmitting, to the first application and subsequent to receiving the indication of whether the interaction at the first application is authenticated, the one or more authentication tokens in response to the fourth request based at least in part on the first user authenticating the interaction at the first application.

Aspect 9: The method of any of aspects 1 through 8, further comprising: transmitting, to the first application, an authentication expiration indication based at least in part on an expiration of a timer associated with receiving the indication from the first user of whether the interaction at the first application is authenticated, wherein the authentication expiration indication includes a denial of authentication of the interaction at the first application.

Aspect 10: An apparatus for backchannel authentication, comprising one or more memories storing processor-executable code, and one or more processors coupled with the one or more memories and individually or collectively operable to execute the code to cause the apparatus to perform a method of any of aspects 1 through 9.

Aspect 11: An apparatus for backchannel authentication, comprising at least one means for performing a method of any of aspects 1 through 9.

Aspect 12: A non-transitory computer-readable medium storing code for backchannel authentication, the code comprising instructions executable by one or more processors to perform a method of any of aspects 1 through 9.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for backchannel authentication, comprising:

receiving, from a first application, a first request to initiate a backchannel authentication procedure associated with an interaction by a first user with the first application, the first request comprising an indication of the interaction;

transmitting, to the first user, a second request to authenticate the interaction at the first application indicated via the first request, the second request comprising an identifier for a set of contextual information associated with the interaction;

receiving, from the first user, a third request for the set of contextual information associated with the interaction, the third request comprising the identifier for the set of contextual information;

transmitting, to the first user, the set of contextual information associated with the interaction based at least in part on the third request comprising the identifier for the set of contextual information;

receiving, from the first user and in response to the second request, an indication of whether the interaction at the first application is authenticated based at least in part on transmitting the set of contextual information; and transmitting, to the first application, the indication based at least in part on receiving the indication from the first user.

2. The method of claim 1, wherein transmitting the indication comprises:

transmitting, to the first application, one or more authentication tokens based at least in part on the interaction at the first application being authenticated.

3. The method of claim 1, wherein transmitting the indication comprises:

transmitting, to the first application, a first indication that the first user authenticated the interaction at the first application or a second indication that the first user denied authenticating the interaction at the first application.

4. The method of claim 1, wherein transmitting the second request comprises:

transmitting the second request via a push notification message, the push notification message comprising the identifier for the set of contextual information associated with the interaction and an access token that is associated with a device key, the device key being associated with a device operated by the first user.

5. The method of claim 4, wherein transmitting the second request via the push notification message comprises:

transmitting, via the push notification message, a request to access the first application, the request to access the first application comprising a request for a set of login credentials associated with the first application and the first user;

receiving, from the first application via the third request, the identifier for the set of contextual information, the set of login credentials, the access token indicated via the second request, and a proof-of-possession indication; and transmitting, to the first user, the set of contextual information associated with the interaction based at least in part on the set of login credentials indicated via the third request being associated with the first application and the first user and on authentication of the access token and the proof-of-possession indication.

6. The method of claim 1, wherein the identifier for the set of contextual information is a randomly generated identifier.

7. The method of claim 1, further comprising:

transmitting, to the first application and in response to the first request, an authentication request identifier;

receiving, from the first application, a fourth request for one or more authentication tokens, the fourth request comprising the authentication request identifier; and refraining from providing a response to the fourth request prior to receiving the indication of whether the interaction at the first application is authenticated.

8. The method of claim 7, further comprising:

transmitting, to the first application and subsequent to receiving the indication of whether the interaction at the first application is authenticated, the one or more authentication tokens in response to the fourth request based at least in part on the first user authenticating the interaction at the first application.

9. The method of claim 1, further comprising:

transmitting, to the first application, an authentication expiration indication based at least in part on an expiration of a timer associated with receiving the indication from the first user of whether the interaction at the first application is authenticated, wherein the authentication expiration indication includes a denial of authentication of the interaction at the first application.

10. An apparatus for backchannel authentication, comprising:

one or more memories storing processor-executable code; and one or more processors coupled with the one or more memories and individually or collectively operable to execute the code to cause the apparatus to:

receive, from a first application, a first request to initiate a backchannel authentication procedure associated with an interaction by a first user with the first application, the first request comprising an indication of the interaction;

transmit, to the first user, a second request to authenticate the interaction at the first application indicated via the first request, the second request comprising an identifier for a set of contextual information associated with the interaction;

receive, from the first user, a third request for the set of contextual information associated with the interaction, the third request comprising the identifier for the set of contextual information;

transmit, to the first user, the set of contextual information associated with the interaction based at least in part on the third request comprising the identifier for the set of contextual information;

receive, from the first user and in response to the second request, an indication of whether the interaction at the first application is authenticated based at least in part on transmitting the set of contextual information; and transmit, to the first application, the indication based at least in part on receiving the indication from the first user.

11. The apparatus of claim 10, wherein, to transmit the indication, the one or more processors are individually or collectively operable to execute the code to cause the apparatus to:

transmit, to the first application, one or more authentication tokens based at least in part on the interaction at the first application being authenticated.

12. The apparatus of claim 10, wherein, to transmit the indication, the one or more processors are individually or collectively operable to execute the code to cause the apparatus to:

transmit, to the first application, a first indication that the first user authenticated the interaction at the first application or a second indication that the first user denied authenticating the interaction at the first application.

13. The apparatus of claim 10, wherein, to transmit the second request, the one or more processors are individually or collectively operable to execute the code to cause the apparatus to:

transmit the second request via a push notification message, the push notification message comprising the identifier for the set of contextual information associated with the interaction and an access token that is associated with a device key, the device key being associated with a device operated by the first user.

14. The apparatus of claim 13, wherein, to transmit the second request via the push notification message, the one or more processors are individually or collectively operable to execute the code to cause the apparatus to:

transmit, via the push notification message, a request to access the first application, the request to access the first application comprising a request for a set of login credentials associated with the first application and the first user;

receive, from the first application via the third request, the identifier for the set of contextual information, the set of login credentials, the access token indicated via the second request, and a proof-of-possession indication; and transmit, to the first user, the set of contextual information associated with the interaction based at least in part on the set of login credentials indicated via the third request being associated with the first application and the first user and on authentication of the access token and the proof-of-possession indication.

15. The apparatus of claim 10, wherein the identifier for the set of contextual information is a randomly generated identifier.

16. A non-transitory computer-readable medium storing code for backchannel authentication, the code comprising instructions executable by one or more processors to:

receive, from a first application, a first request to initiate a backchannel authentication procedure associated with an interaction by a first user with the first application, the first request comprising an indication of the interaction;

transmit, to the first user, a second request to authenticate the interaction at the first application indicated via the first request, the second request comprising an identifier for a set of contextual information associated with the interaction;

receive, from the first user, a third request for the set of contextual information associated with the interaction, the third request comprising the identifier for the set of contextual information;

transmit, to the first user, the set of contextual information associated with the interaction based at least in part on the third request comprising the identifier for the set of contextual information;

receive, from the first user and in response to the second request, an indication of whether the interaction at the first application is authenticated based at least in part on transmitting the set of contextual information; and transmit, to the first application, the indication based at least in part on receiving the indication from the first user.

17. The non-transitory computer-readable medium of claim 16, wherein the instructions to transmit the indication are executable by the one or more processors to:

transmit, to the first application, one or more authentication tokens based at least in part on the interaction at the first application being authenticated.

18. The non-transitory computer-readable medium of claim 16, wherein the instructions to transmit the indication are executable by the one or more processors to:

transmit, to the first application, a first indication that the first user authenticated the interaction at the first application or a second indication that the first user denied authenticating the interaction at the first application.

19. The non-transitory computer-readable medium of claim 16, wherein the instructions to transmit the second request are executable by the one or more processors to:

transmit the second request via a push notification message, the push notification message comprising the identifier for the set of contextual information associated with the interaction and an access token that is associated with a device key, the device key being associated with a device operated by the first user.

20. The non-transitory computer-readable medium of claim 19, wherein the instructions to transmit the second request via the push notification message are executable by the one or more processors to:

transmit, via the push notification message, a request to access the first application, the request to access the first application comprising a request for a set of login credentials associated with the first application and the first user;

receive, from the first application via the third request, the identifier for the set of contextual information, the set of login credentials, the access token indicated via the second request, and a proof-of-possession indication; and transmit, to the first user, the set of contextual information associated with the interaction based at least in part on the set of login credentials indicated via the third request being associated with the first application and the first user and on authentication of the access token and the proof-of-possession indication.

* * * * *